No. 649,556. Patented May 15, 1900.
N. SHAW.
DOMESTIC HEATING VESSEL.
(Application filed Oct. 19, 1898.)

(No Model.)

Witnesses
John F. Denferwid
L. P. Holhaupt

By his Attorneys,
C. A. Snow & Co.

Inventor
Noah Shaw,

UNITED STATES PATENT OFFICE.

NOAH SHAW, OF EAU CLAIRE, WISCONSIN.

DOMESTIC HEATING VESSEL.

SPECIFICATION forming part of Letters Patent No. 649,556, dated May 15, 1900.

Application filed October 19, 1898. Serial No. 694,016. (No model.)

*To all whom it may concern:*

Be it known that I, NOAH SHAW, a citizen of the United States, residing at Eau Claire, in the county of Eau Claire and State of Wisconsin, have invented a new and useful Domestic Heating Vessel, of which the following is a specification.

This invention relates to domestic heating vessels; and it has for its object to effect certain improvements in vessels of this character whereby the heating surface or area thereof shall be increased, so as to expedite the thorough heating of the vessel and the contents thereof.

With this object in view the invention primarily contemplates improved means for concentrating the heat about a cooking vessel and for providing for such a circulation of the heat as to insure a quick heating of the vessel. Carrying out these objects it is the purpose of the invention to adapt the improvements to different kinds of domestic vessels—such as water-boilers, tea and coffee pots, and also to vessels used as cooking utensils.

With these and other objects in view, which will readily appear as the nature of the invention is better understood, the same consists in the novel construction, combination, and arrangement of parts hereinafter more fully described, illustrated, and claimed.

Figure 1:
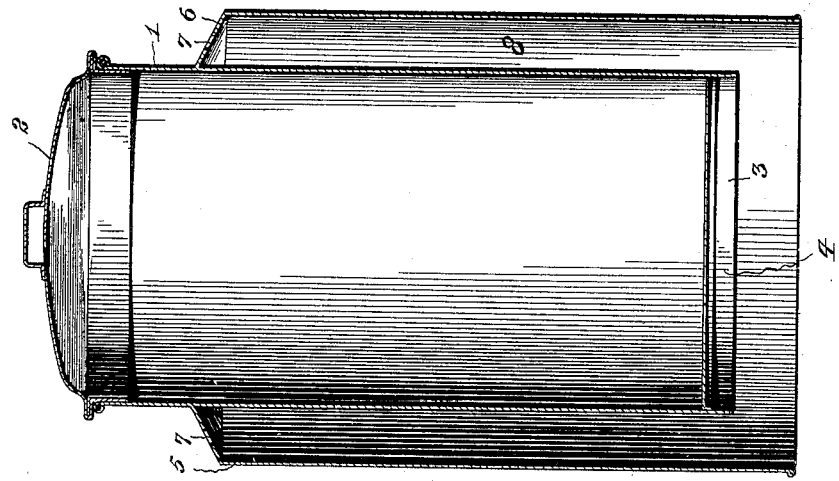
Figure 2:
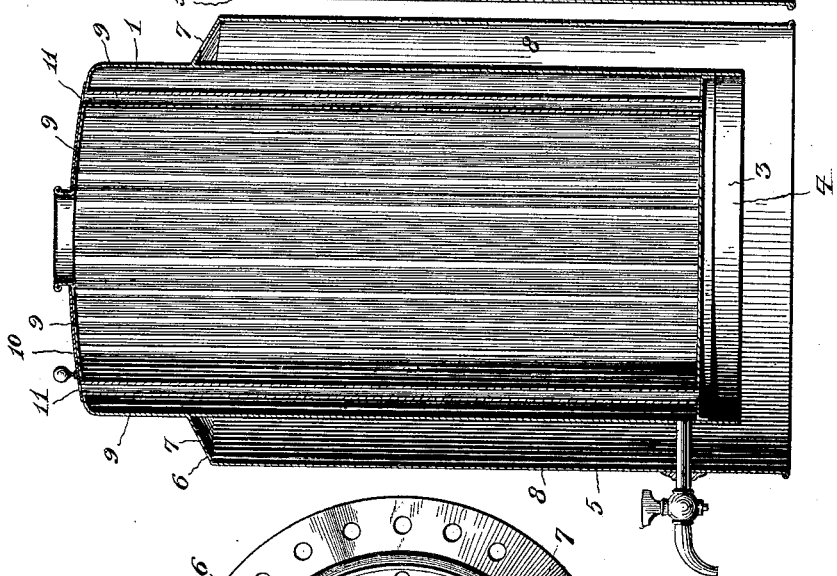
Figure 3:
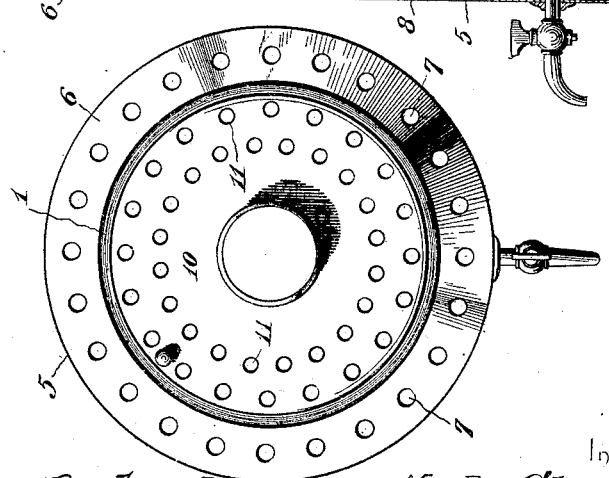

In the drawings, Figure 1 is a vertical sectional view of a cooking utensil embodying the improved construction contemplated by the present invention. Fig. 2 is a similar view showing the improvement applied to a domestic vessel used as a water-boiler or the like. Fig. 3 is a top plan view of the construction shown in Fig. 2.

Referring to the accompanying drawings, the numeral 1 designates the body of the vessel, usually made in a cylindrical form and provided with the ordinary top or cover 2. In the present invention the vessel-body 1 is provided at its lower end with an annular pendent flange 3, forming a heat chamber or pocket 4 at the bottom of the body, so that the heat from the stove, lamp, burner, or other source of heat will collect and concentrate within the said chamber or pocket and thoroughly and uniformly heat up the bottom of the vessel.

In addition to the pendent flange 3 the vessel-body is provided with an exterior annular jacket-apron 5. This jacket-apron 5 extends nearly the full height of the vessel and is provided with a closed top portion 6, joined to the outer side of the vessel-body, which closed top portion of the jacket-apron has formed therein a series of vent-openings 7, through which the heat may escape. The jacket-apron 5 is spaced from the exterior of the vessel-body to form around the same an annular heat-circulating space 8, and the lower edge of the jacket-apron projects below the plane of the pendent bottom flange 3, so that all heat which escapes out of the heat chamber or pocket 4 passes into the annular heat-circulating space 8 and circulates around and in direct contact with the sides of the body before escaping through the vent 7. In this way every particle of heat directed against the bottom of the cooking vessel is confined and caused to circulate uniformly around the entire vessel before passing into the outer air. A thorough utilization of heat is thus effected, with a consequent rapid heating of the vessel.

In Fig. 1 of the drawings the vessel is shown adapted for cooking purposes, as an ordinary cooking utensil; but in Figs. 2 and 3 of the drawings the improvements described are shown in connection with a vessel designed especially as a boiler for water. In this construction the top and bottom of the vessel-body are connected by a plurality of hot-air tubes 9, preferably arranged in concentric circles and alternately, so as to increase the heating area covered by said tubes. The lower ends of the tubes open into the bottom heat chamber or pocket, while their upper ends communicate with the outer air and are preferably covered and uncovered by a sliding draft plate or ring 10. The draft plate or ring 10 is slidably mounted on top of the vessel and is provided therein with a series of openings 11, corresponding to the tube-openings at the top of the vessel, and by manipulating said slide the draft through the tubes 9 may be readily controlled.

It has already been explained that the improvements can be applied to any type of domestic heating vessel for the purpose of increasing the heating surface or area thereof, and in thus applying the improvements to different vessels it will be understood that changes in the form, proportion, and the minor details of construction may be resorted to without departing from the principle or sacrificing any of the advantages of this invention.

Having thus described the invention, what is claimed as new, and desired to be secured by Letters Patent, is—

A domestic heating vessel provided with an annular pendent flange projecting below the plane of its bottom, and forming with the latter, a heating chamber or pocket, an exterior annular jacket-apron extending nearly the full height of the vessel-body and projecting below the plane of said pendent flange, a plurality of hot-air tubes extending from said heating chamber or pocket to the top of the vessel-body, and a circular perforate draft-plate centrally pivoted on top of the vessel and adapted to cover and uncover the upper ends of said tubes, substantially as set forth.

In testimony that I claim the foregoing as my own I have hereto affixed my signature in the presence of two witnesses.

NOAH SHAW.

Witnesses:
   JOHN H. SIGGERS,
   FRANCES PEYTON SMITH.